United States Patent

[11] 3,593,611

| [72] | Inventor | Leonard G. Sagehorn |
| | | Kansas City, Mo. |
| [21] | Appl. No. | 857,955 |
| [22] | Filed | Sept. 15, 1969 |
| [45] | Patented | July 20, 1971 |
| [73] | Assignee | Industrial Grinding & Supply Co. |
| | | Kansas City, Mo. |

[54] CUTTING BLADE STRUCTURE
6 Claims, 5 Drawing Figs.

[52] U.S. Cl. .................................................. 83/697,
83/620, 83/698
[51] Int. Cl. .................................................. B26d 1/06
[50] Field of Search ....................................... 83/697,
698, 620, 662, 679, 915, 660, 689, 695, 694, 49

[56] References Cited
UNITED STATES PATENTS

| 232,647 | 9/1880 | Lewis | 83/679 |
| 390,327 | 10/1888 | Wheeler | 83/620 |
| 906,572 | 12/1908 | Smith | 83/620 |
| 1,357,727 | 11/1920 | Roach | 83/143 |
| 1,660,387 | 2/1928 | Masel | 83/915 X |
| 3,340,758 | 9/1967 | Peterson et al. | 83/697 |

*Primary Examiner*—Frank T. Yost
*Attorney*—Fishburn, Gold and Litman

ABSTRACT: A cutting blade structure for use in a material working apparatus, such as a shear for cutting fiberglas matting. The cutting blade has an elongate blade mounting or backing member secured in the material working apparatus for movement toward and away from material to be cut. A pair of end members are mounted on one side of the backing member at opposite ends thereof with the end members having substantially parallel facing edges for facilitating positioning a plurality of cutting blades or members between the end members. The cutting members each are secured to the backing member and have sharpened free ends extending beyond the backing member for cutting the respective material. The cutting members are elongate and have their free ends inclined relative to the long dimension thereof with each cutting member forming one tooth of a saw tooth edge of the cutting blade structure.

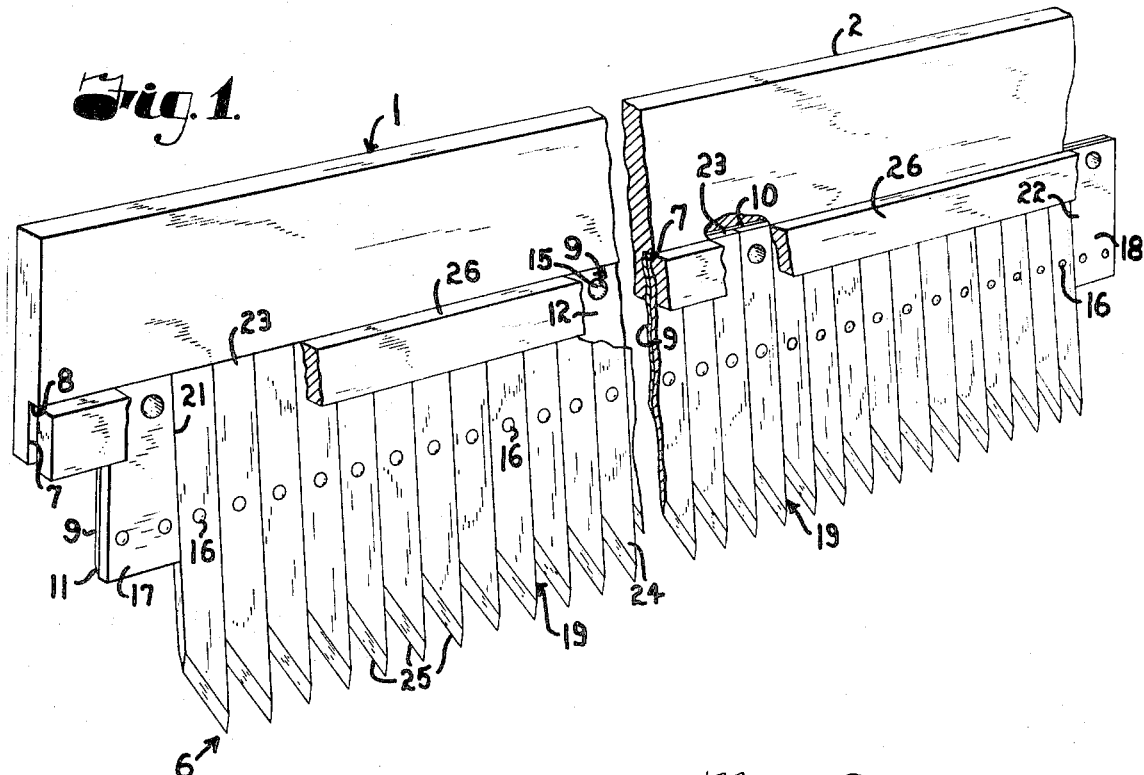
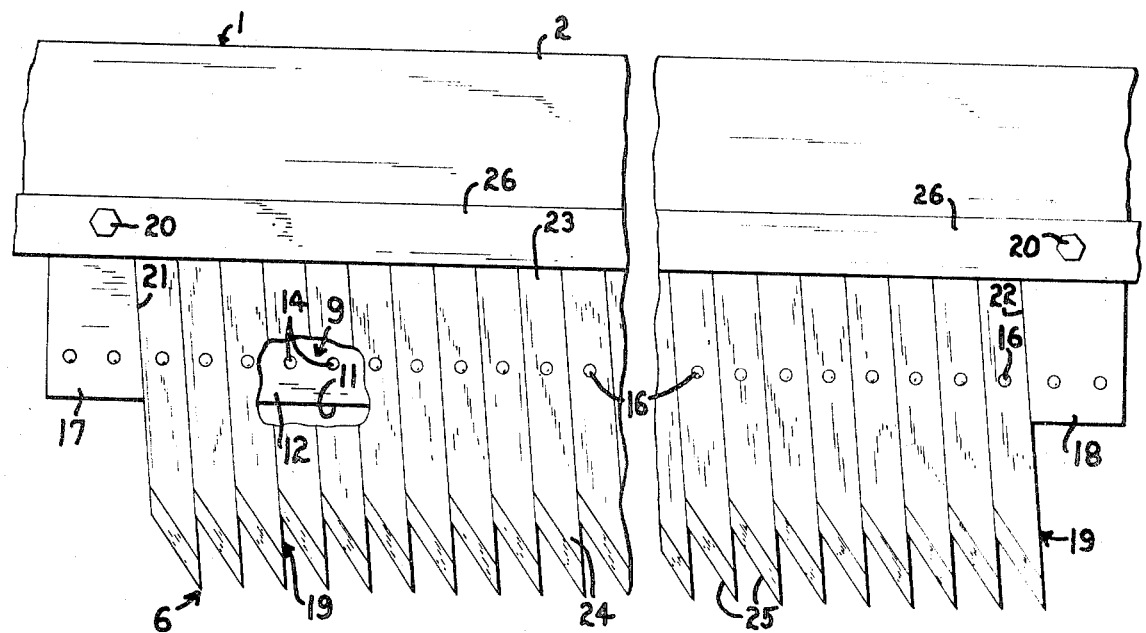

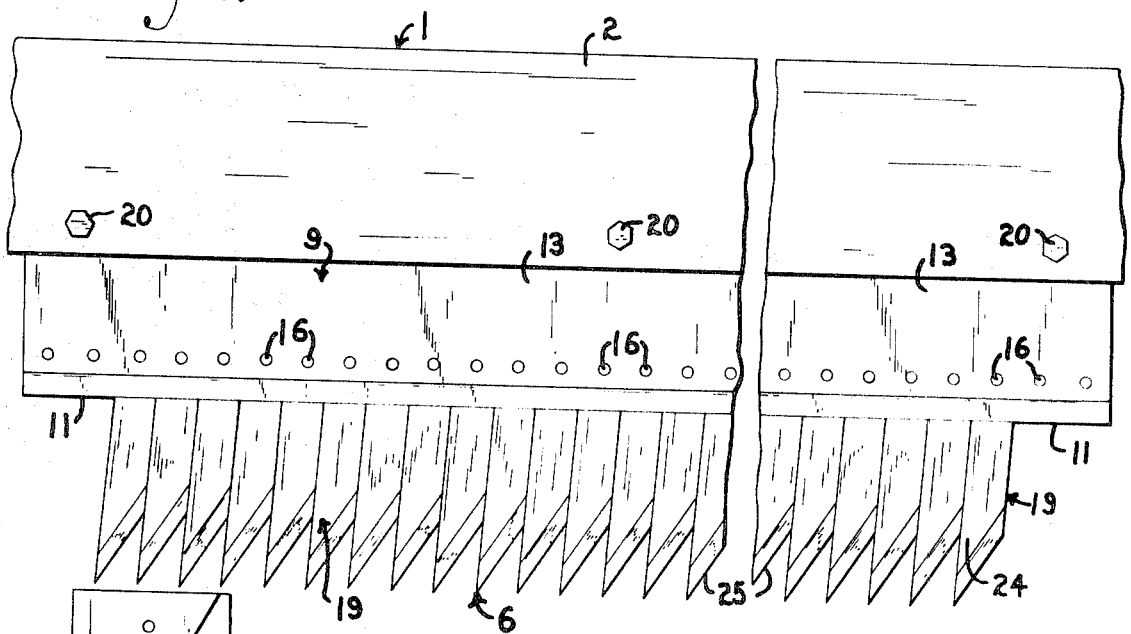
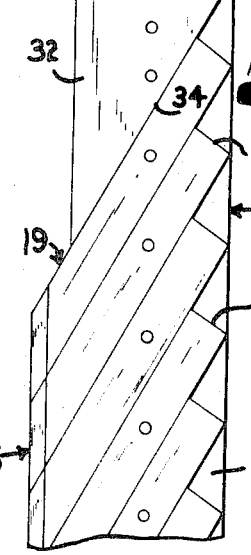
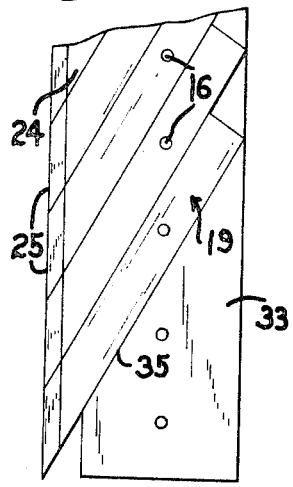
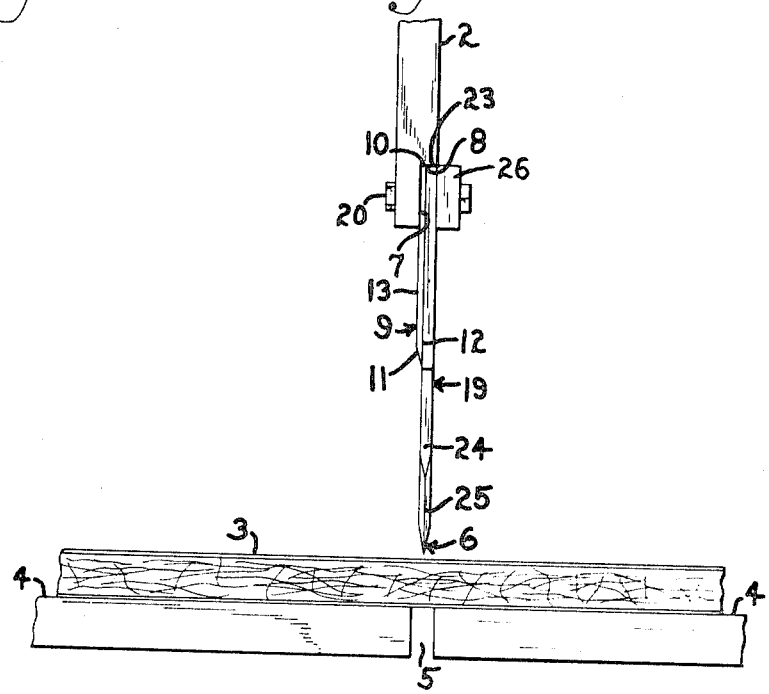
INVENTOR.
Leonard Sagehorn
BY
Frichtmen, Golfa, Litman
ATTORNEYS

CUTTING BLADE STRUCTURE

The present invention relates to cutting blade structures and more particularly to a cutting blade structure having a plurality of interchangeable removably mounted cutting members having their cutting edges arranged ro form a sawtooth edge.

Heretofore, blades for cutting material, such as fiberglas to make matting, insulation bats or the like, were in the form of a single elongate planar member having notches in the cutting edge to form a sawtooth edge. When excessive resistance or a hard object, such as wet fiberglas, was engaged, there was danger of breaking one or more of the teeth of the blade. Sharpening of such solid blades was time consuming and it was particularly difficult to sharpen evenly and produce a uniform cutting edge.

The principal objects of the present invention are: to provide a cutting blade structure having a plurality of interchangeable removably mounted cutting members each of which are easily sharpened and replaced when broken, thereby substantially eliminating the aforementioned difficulties, to provide such a cutting blade structure wherein each of the cutting members are elongate members and each has a cutting edge inclined relative to their long dimension and each cutting member forms a single tooth in a sawtooth cutting edge for the cutting blade structure; to provide such a cutting blade structure with a plurality of blades which move bodily normal or transverse to the material to be cut to expose their respective cutting edge for engagement with the material to be cut; to provide such a cutting blade structure wherein leading edges of the sharpened ends overlap a trailing edge of the sharpened end of the next adjacent cutting member, and to provide such a cutting blade structure which is economical to manufacture, positive inoperation, easily sharpened and particularly well adapted for the proposed use.

Other objects and advantages of this invention will become apparent from the following description taken in connection with the accompanying drawings wherein are set forth by way of illustration and example certain embodiments of this invention.

FIG. 1 is a perspective view of a cutting blade structure embodying features of the present invention with portions broken away to better illustrate the component parts.

FIG. 2 is a front elevational view of the cutting blade structure.

FIG. 3 is a rear elevational view of the cutting blade structure.

FIG. 4 is an end elevational view of the cutting blade structure and showing material to be cut.

FIG. 5 is an elevational view of a structure for holding cutting members in a position to have their respective cutting edges uniformly sharpened as a unit.

Referring more in detail to the drawings:

The reference numeral 1 generally designates a cutting blade structure mounted on an elongated movable blade support 2 of a material working apparatus, such as a shear (not shown). The blade support 2 extends between longitudinally spaced end members having suitable guides thereon for directing the blade support 2 in a substantially vertical reciprocating movement to cut material, such as a strip 3 of matting formed of a multiplicity of fiberglas fiber moved along a path over a suitable horizontal work platform or surface 4 having a suitable slot 5 therein to permit a cutting edge 6 of the cutting blade structure 1 to move through the fiberglas strip 3 to cut same.

It is desirable to transfer the full moving force of blade support 2 to the cutting blade structure 1 and to the material 3 to be cut. Therefore, in the form shown, the blade support 2 is an elongate planar substantially vertical member having a notch 7 in a lower edge thereof to form a downwardly facing shoulder 8 to be engaged by the cutting blade structure 1, whereby the full downward force of the blade support 2 is transferred to the cutting blade structure 1 to cut the fiberglas 3.

The cutting blade structure 1 is an elongate, thin and relatively narrow structure. THe cutting blade structure 1 is adapted for forming cutting edges of a length in the nature of 90inches or more and the structure has a width in the nature of 5 inches The cutting blade structure 1 has a elongate backing or mounting member 9 having an upper edge 10 engaged with the shoulder 8 of the notch 7 in the blade support 2. The backing or mounting member 9 is a relative narrow and thin member. Suitable dimension for the mounting member 9 are 3 inches wide by one-sixteenth inch thick by the desired length.

It is desirable to separate portions of the material 3 cut by the cutting edge 6 in the event same is engaged by a lower edge 11 of the mounting member 9, therefore, the lower edge 11 of the backing member 9 is tapered from a front side or surface 12 to a back surface 13 thereof to form an included angle between the front surface 12 and the tapered surface in the nature of 15°.

A plurality of apertures 14 are positioned adjacent the lower edge 11 of the backing member 9 and are longitudinally spaced therealong to receive suitable fastening devices, such as rivets or bolts 16, to secure longitudinally spaced end members 17 and 18 on the front side or surface 12 of the backing member 9 and to secure a plurality of elongate planar cutting members 19 therebetween. A plurality of apertures 15 are positioned adjacent the upper edge 10 of the mounting or backing member 9 to receive suitable fastening members, such as rivets or bolts 20, to secure the end members 17 and 18 and the cutting members 19 onto the backing member 9 and to secure the backing member 9 within the notch 7 of the blade support 2.

The end members 17 and 18 are mounted on the front side or surface 12 of the backing member 9 and are positioned at opposite ends thereof. The end member 17 and 18 have substantially parallel facing edges 21 and 22 respectively. The facing edges 21 and 22 of the end members 17 and 18 are inclined relative to the long dimension of the backing member 9 to position the cutting members 19 held therebetween at an angle with the movement of the blade support 2 to provide rake or clearance in the cutting edge 6. THe cutting members 19 are each thin flat bladelike members having their free end sharpened whereby when the cutting members 19 are inclined relative to the lower edge 11 of the backing member 9 and same is moved substantially normal or transverse to the material 3 to be cut, a leading edge or point of the sharpened end overlaps a trailing edge of the sharpened end of the next adjacent cutting member 19. In the illustrated structure, the facing edges 21 and 22 are parallel and inclined in the nature of 5° from the direction of movement of the backing or mounting member 9.

The cutting members 19 are mounted on the front side or surface 12 of the backing or mounting member 9 and are positioned in edge to edge engagement between the facing edges 21 and 22 of the end members 17 and 18. The cutting members 19 each extend substantially beyond or below the lower edge 11 of the backing member 9 to permit the cutting blade structure 1 to have sufficient movement to more than cut through the thickness of the fiberglas 3.

Suitable dimensions for each cutting member 19 are 5 inches more or less in length by one-half inch wide by one-eight inch thick. The free ends of the cutting members 19 each extend approximately 2 inches beyond the lower edge 11 of the backing member 9.

It is desirable for the upper ends of the cutting members to engage the shoulder 8 whereby the full moving force of the blade support 2 is transferred to the cutting members 19. Therefore, each of the cutting members 19 has an upper end 23 inclined relative to the long dimension thereof whereby the inclined upper end 23 of the cutting members 19 are aligned in registry with the upper edge 11 of the backing member 9 and positioned to fit within the notch 7 of the blade support 2 and to engage the shoulder 8. It is desireable that the inclined upper end 23 be inclined at an angle equal to the incline of the members 19. In the illustrated structure, the upper ends 23 are inclined in the nature 5° from a line normal to the long dimension of the respective cutting member 19.

The cutting member 19 each have lower or free ends 24 which are sharpened and positioned to form portions of the cutting edge 6 of the cutting structure 1 and in the illustrated structure, the free ends 24 of each of the cutting members 19 have edge portions of the side surfaces sloped or tapered to intersect at a cutting edge 25 of the respective cutting member 19. It is preferable that the cutting edge 25 of each cutting member 19 have a cutting point at a leading edge thereof and that the cutting edge 25 be inclined relative to the long dimension thereof to form one tooth of the sawtooth cutting edge 6 with the major portion of each cutting edge 25 exposed and a trailing edge thereof overlapped by the point or leading edge of the next adjacent cutting member 19 to provide clearance between the adjacent leading and trailing edges of the cutting members 19. The cutting edge 25 is inclined relative to the long dimension of the respective cutting member 19 whereby the cutting edge 25 of each cutting member 19 forms one tooth of the sawtooth cutting edge 6 of the cutting blade structure 1. In the illustrated structure, the double bevel or taper of the cutting edge 25 is in the nature of 15° from the respective surface for both sides or surfaces of the respective cutting member 19 to form an included angle of 30° and the cutting edge 25 is inclined at an angle in the nature of 30° from a line normal to the long dimension of the respective cutting member 19.

Each cutting member 19 has an aperture intermediate the ends thereof to receive the rivets or bolts 16 to fasten the respective cutting member 19 to the backing or mounting member 9.

It is desirable to hold the width of the cutting members 19 to very precise dimensions, such as 0.500 to 0.498, so that when the cutting members 19 are butted in edge to edge relation between the end members 17 and 18, they can be accurately positioned to form an elongate saw tooth cutting edge 6, for example, in the nature of 90 inches more or less.

It is also desirable to restrain lateral and transverse movement of the cutting members 19, therefore, the upper ends 23 of the cutting members 19 are secured in clamping engagement between a mounting bar 26 and the blade support 2. Due to the length of the cutting blade structure 1, it may be necessary for selected cutting members 19 to have an aperture adjacent their upper end 23 to receive the rivet or bolt 20 for holding the cutting members 19, backing member 9 in clamped position between the blade support 2 and the mounting bar 26.

Particularly in the making of fiberglas mats or the like, as for example, insulation bats, the fiberglas is formed in long strips and cut to length by the cutting blade structure 1 moving vertically through same.

When the cutting blade structure 1 engages a hard object, such as wet fiberglas, and one or more of the cutting members 19 are damaged as by having a portion thereof broken off, it is a simple operation to remove the damaged cutting member or members 19 and replace same with new cutting members having their cutting edge 25 shaped similar to the cutting edges 25 of the remaining cutting members 19. The illustrated and described cutting blade structure 1 provides ease of removal and replacement of the cutting members 19 and particularly ease of sharpening same which is not possible with solid blades.

FIG. 5 illustrates a sharpening structure 30 for holding the cutting members 19 in position for sharpening their respective cutting edges 25 at a uniform bevel on both sides thereof and at a uniform angle relative to a line normal or perpendicular to the long dimension of the respective cutting member 19.

The illustrated sharpening structure 30 has an elongate support member 31 having positioning members 32 and 33 mounted on one side of the support member 31 and positioned at opposite ends thereof. The positioning members 32 and 33 are shaped for positioning the cutting members 19 therebetween in a position having their cutting edges 25 aligned and in registry for sharpening thereof. The positioning members 32 and 33 have facing edges 34 and 35 which are substantially parallel and are inclined relative to the long dimension of the support member 31, for example at an angle therewith substantially equal to the angle formed between the cutting edges 25 and a line normal to the long dimension of the respective cutting members 19.

When it is desired to sharpen the cutting edges 25 of the cutting members 19 or when it is necessary due to wear, the cutting members 19 are removed from the mounting or backing member 9 of the cutting blade structure 1 and secured to the support member 31 in edge to edge engagement between the positioning members 32 and 33. A suitable sharpening device, such as a grinder (not shown), is moved longitudinally along each face of the free ends 24 of the cutting members 19 to produce a uniform slope or taper and to produce a continuous cutting edge 25 whereby when the cutting members are placed in the cutting blade structure 1 the saw tooth cutting edge 6 thereof will be shaped and positioned to provide a continuous cut through the material 3.

It is to be understood that while I have illustrated and described certain embodiments of my invention, it is not to be limited to these specific forms or arrangements of parts herein described and shown.

What I claim and desire to secure by Letters Patent is:

1. A structure comprising:
   a. an elongate mounting member, said mounting member being planar and having opposed edges;
   b. a plurality of planar cutting members mounted on one side of said mounting member, said cutting members each having one end thereof sharpened and extending beyond one edge of said mounting member;
   c. positioning means for holding said cutting members in edge to edge engagement and positioned each sharpened end to form one tooth of an elongate sawtooth edge; and
   d. mounting means for holding said mounting member and said cutting members in a material working apparatus.

2. The blade structure as set forth in claim 1 wherein:
   a. said positioning means includes planar end members mounted on said one side of said mounting member adjacent opposite ends thereof;
   b. said end members have substantially parallel facing edges;
   c. said facing edges of said end members are inclined relative to said one edge of said mounting member; and
   d. said cutting members are positioned between and in engagement with said facing edges of said end members whereby said cutting members are each inclined relative to said one edge of said mounting members.

3. The blade structure as set forth in claim 1 wherein:
   a. said cutting members are each elongate and have the sharpened end thereof inclined relative to the long dimension thereof whereby clearance is provided by a leading edge of said sharpened end of the next adjacent cutting member.

4. The blade structure as set forth in Claim 3 wherein:
   a. said material working apparatus has a blade support for receiving and supporting said mounting member;
   b. said blade support with said mounting member and cutting members thereon is movable substantially transversely toward material to be cut; and
   c. said one edge of said mounting member tapers from said one side having cutting members mounted thereon to the other edge to separate portions of material cut by said sharpened ends and engaged by said one edge of said mounting member.

5. The blade structure as set forth in claim 4 wherein:
   a. said blade support is a planar member having a notch in one edge thereof to form a shoulder to be engaged by the other edge of said mounting member therein;
   b. said cutting members each have the other end thereof inclined relative to the long dimension thereof;